3,155,578
ANTIBIOTIC A22765 AND PROCESS OF
PRODUCTION
Ernst Gaeumann, Zurich, Ernst Vischer, Basel, and Hans
Bickel, Binningen, Switzerland, assignors to Ciba Corporation, a corporation of Delaware
Filed Mar. 15, 1961, Ser. No. 95,882
Claims priority, application Switzerland, Mar. 17, 1960,
3,040/60
23 Claims. (Cl. 167—65)

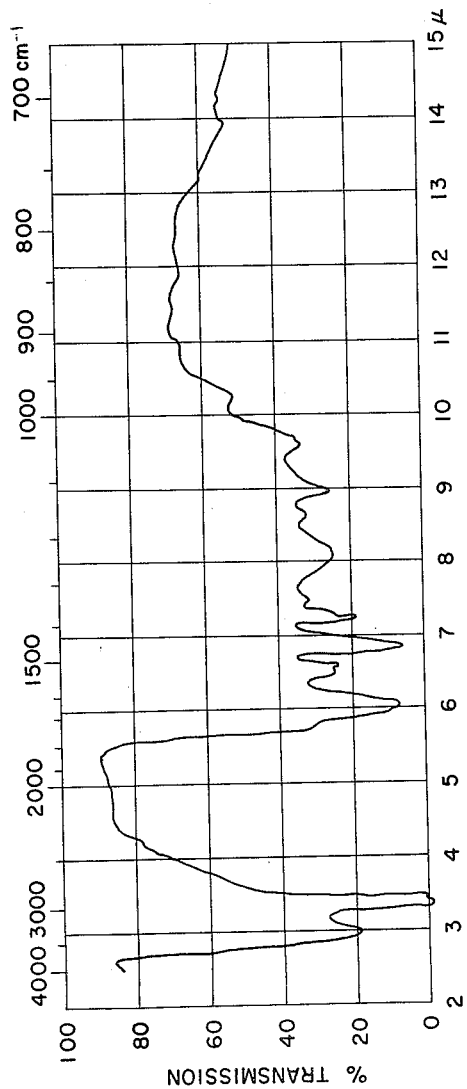

The present invention provides a new, water-soluble antibiotic hereinafter called A22765, its components salts and derivatives, as well as pharmaceutical preparations containing these compounds and a process for the manufacture of these substances and of preparations containing them.

The antibiotic A22765 is produced by cultivating a new strain of actinomycetes belonging to the species Streptomyces aureofaciens which was isolated from a soil specimen collected at Lucknow, India, and which is kept in our laboratories as well as the Eidg. Technischen Hochschule, Institute for Special Botany, under reference strain A22765 and at the United States Department of Agriculture, Agricultural Research Service, Northern Research and Development Division, Peoria, Illinois, under reference strain NRRL 2858.

Streptomyces aureofaciens NRRL 2858 forms spores having a smooth to slightly pimply surface. The spore chains are monopodially branched, and have open, irregular spirals consisting in most cases of 3 to 4 coils. The fully matured air mycelium is of ash grey color. When grown on a peptone-containing substratum the strain NRRL 2858 produces no melanoid coloration.

To characterise it further the growth of Streptomyces aureofaciens NRRL 2858 on different nutrients is described below. The nutrients 1 to 7 and 10 were prepared as described by W. Lindenbein, in Arch. Mikrobiol. 17, page 361 (1952).

(1) Synthetic agar: Growth initially punctiform and whitish yellow, subsequently wrinkly and pale yellow.
(2) Synthetic solution: Sediment punctiform to pustular, milky white.
(3) Glucose-agar: Growth wrinkly initially yellowish brown, subsequently pale brown; substratum pale brown; air mycelium velvety to partially slightly woolly, whitish grey.
(4) Glucose-asparagine-agar: Growth thin, cloudy, whitish yellow; air mycelium initially chalky white, subsequently ash grey, forming an even coating.
(5) Calcium malate-agar: Growth thin, cloudy, initially milky white, subsequently whitish yellow.
(6) Gelatine stab (18° C): Growth very sparse, only trace of liquefaction.
(7) Starch plate: Growth pustular, milky white; only trace of starch hydrolysis after 11 days.
(8) Potatoes: Growth very slow, lichen-like, pale brown; air mycelium sparse, dusty, whitish grey; substratum partially colored blackish brown.
(9) Carrots: Growth sparse.
(10) Litmus milk: Growth initially slow, subsequently very good; annular growth blackish brown, likewise the substratum; little peptonization, no coagulation noticeable; medium turns black so that color of litmus can no longer be determined.

The following species of Streptomyces are known to form an ash grey air mycelium and spiral sport chains: S. noursei Brown et al., S. echinatus Corbaz et al., S. albogriseolus Benedict et al., S. macrosporeus Ettlinger et al., S. griseoflavus (Krainsky) Waksman et Henrici, S. pilosus Ettlinger et al., S. flaveolus (Waksman) Waksman et Henrici, S. hygroscopicus (Jensen) Waksman et Henrici, S. aureofaciens Duggar, S. parvulus Waksman et Gregory and S. galilaeus Ettlinger et al, (cf. Ettlinger et al., Arch. Mikrobiol. 31, pages 326 [1958]). A comparison of photographs of the spores under an electron microscope revealed that most of the aforementioned species differ from the strain NRRL 2858: While the strain NRRL 2858 has spores of a smooth to pimply surface, spores having appendices are found in the strains S. noursei, S. echinatus, S. Albogriseolus, S. macrosporeus, S. griseoflavus, S. pilosus and S. flaveolus. Another strain that differs very clearly from strain NRRL 2858 is Streptomyces hygroscopicus, namely by its distinctly closed, often almost knotted spirals of the spore chains. Likewise, Streptomyces galilaeus is very to distinguish from strain NRRL 2858 since it differs both as regards the type of spirals (strain NRRL 2858: open, irregular; S. galilaeus: open, regular), and its ability to form melanine on a peptone-containing nutrient (strain NRRL 2858 does not possess this ability). The other two species (Strepomyces parvulus and Streptomyces aureofaciens) are compared with the strain NRRL 2858 in the following table:

TABLE

| | S. parvulus | S. aureofaciens | Strain NRRL 2858 |
|---|---|---|---|
| Surface of spores | Smooth | Smooth to pimply | Smooth to pimply. |
| Color of air mycelium | Ash grey | Ash grey | Ash grey. |
| Morphology of spore chains (type of spiral) | Open, regular; generally more than 6 coils. | Open, irregular; generally fewer than 4 coils. | Open, irregular; generally 3 to 4 coils. |
| Formation of melanine on peptone-containing nurtients. | None | None | None. |

As will be seen from the above table the species S. parvulus and S. aureofaciens differ substantially with regard to the morphology of the spore chains. In all other respects there is an almost complete correspondence between NRRL 2858 and S. aureofaciens. Accordingly, the strain NRRL 2858 is provisionally classified together with the species Streptomyces aureofaciens Duggar.

A number of other strains which were isolated from various soil specimens and which also produce antibiotic A22765, belong according to the above classification likewise to the genus *Streptomyces aureofaciens*, for example the strains A22083, A22141, A22652, A22931, A23269, A23344, A23978, A24034, A24066 A24292, A25536, A25699, A26043, A26354, A26392, A26467, or A26581 which are also deposited under the above designations at the Federal Institute of Technology, Zurich, Institute for Special Botany.

It is already known that several representatives of the genus *S. aureofaciens* produce antibiotics. Thus, tetracyclines (U.S. specification 2,482,055), spiramycins (Antibiotics Annual, 1954–55, page 724), miamycin (Antibiotics and Chemotherapy, vol. 7, page 37 [1957]), heptaenes (Antibiotics and Chemotherapy, vol. 8, page 491 [1958]), and congocidin (Riass, della Comm. VI Congr. Internat. Microbiol. (Roma), vol. 1, page 241 [1953]), are produced by representatives of this type. As will be shown further on, the new antibiotic A22765 differs in a characteristic manner from all these known substances.

As far as the preparation of the antibiotic A22765 is concerned, the present invention is not restricted to the use of *Streptomyces aureofaciens* NRRL 2858 or of another strain corresponding to the above description; it includes also the use of variants of these organisms such as are obtained, for example, by selection or mutation, more especially under irradiation with ultra-violet or X-rays or under the action of nitrogen mustard oils.

To prepare the antibiotic A22765 a Streptomyces strain having the properties of *Streptomyces aureofaciens* NRRL 2858 is grown in an aqueous nutrient medium containing a carbon source, nitrogenous compounds and inorganic salts under aerobic conditions until the culture displays a substantial antibacterial action and the antibiotic A22765 is then isolated.

Suitable sources of assimilable carbon are, for example, carbohydrates such as glucose, saccharose, lactose, mannitol, starch, dextrin and glycerol. As nitrogenous nutrients and if desired growth-promoting substances there may be mentioned: Amino acids, peptides and proteins as well as their degradation products such as peptone or tryptone, furthermore meat extracts, water-soluble constituents of cereal grains such as maize and wheat, of distillation radicals obtained in the manufacture of alcohol, of yeast, beans, more especially of soy-beans, of seeds, for example cotton seeds etc. and also ammonium salts and nitrates. Other inorganic salts present in the nutrient solution may be, for example, chlorides, carbonates, sulfates of alkali metals, alkaline earth metals, magnesium, iron, zinc or manganese.

The cultivation is performed under aerobic conditions, thus for example in a static surface culture or preferably submerged with shaking or stirring with air or oxygen in shaking flasks or the known fermenters. A suitable temperature ranges from 18 to 40° C. Under these conditions the nutrient solution display a substantial antibacterial action in general within 1½ to 5 days.

The antibiotic A22765 can be isolated, for example, by one of the following methods: The mycelium is separated from the culture filtrate, whereupon the bulk of the antibiotic is found in the culture filtrate. Substantial amounts of the antibiotic remain however still adsorbed on the mycelium so that it is advantageous to wash the latter thoroughly, either with water or with an aqueous organic solvent, such as an alcohol for example with aqueous methanol.

To extract the antibiotic from the culture filtrate and to purify it, various methods may be used either singly or two or more in combination. It has proved advantageous to maintain the pH-value of the culture solution during these operations at a value of 4 to 6.

(1) An adsorbent may be used, for example an active carbon such as Norit, an activated earth such as fuller's earth or floridine or an adsorbent resin such as Asmit, m - phenylenediamine - formaldehydi decolorizing resin (U.S. Patent No. 2,854,484). The adsorbates are advantageously eluted with a mixture of a water-miscible organic solvent with water or an aqueous acid, such as a mixture of water+methanol, water+pyridine, dilute acetic acid+methanol or water+methanol+glacial acetic acid+butanol. Particularly good results have been achieved in eluting a Norit adsorbate with a mixture containing 2 parts by volume of water, 1 part by volume of methanol, 1 part by volume of glacial acetic acid and 2 parts by volume of n-butanol.

(2) According to another method of isolating the antibiotic from the culture filtrate the antibiotic is adsorbed on an ion exchanger resin for which purpose a resin containing acid groups, such as Amberlite IRC–50, methacrylic carboxylic acid cationic resin (U.S. Patent No. 2,340,111), is particularly suitable. The elution is advantageously carried out with a dilute acid, for example with methanolic hydrochloric acid.

(3) Furthermore it is possible to precipitate the basic antibiotic directly from the culture filtrate, for example by reaction with an organic acid of the type of picric acid. When the resulting precipitate is treated with a salt of an organic base, for example with triethyl ammonium sulfate or with a dilute acid, the antibiotic is obtained in the form of the relevant salt. This reaction can be performed in an aqueous medium or in a water-miscible solvent such as methanol or acetone. This conversion of a sparingly soluble into a readily soluble salt of the antibiotic is carried out either with the use of a mineral acid or on an ion exchanger resin, for example Amberlite IRA–400, polystyrene quaternary ammonium anionic resin (U.S. Patent No. 2,591,573).

(4) The content of the antibiotic in the culture solution can be enriched by treating an aqueous or alcoholic-aqueous solution of the salt with an excess of an organic water-miscible solvent such as acetone, dioxane or the like, whereupon the salt precipitates in solid form.

(5) According to another method of isolating and/or concentrating the antibiotic an aqueous solution thereof is extracted with a solution of phenol in chloroform, while varying both the pH of the aqueous solution and the phenol content of the chloroform solution. Thus, for example, when the antibiotic is distributed between a solution containing 100 grams of phenol per 100 cc. of chloroform and an aqueous phase of pH=1 to 6, it is present almost exclusively in the organic phase. Taking as the distribution coefficient of the antibiotic the ratio between its concentration in the organic phase to its concentration in the aqueous phase, it will be seen that the distribution coefficient rises as the content of phenol in the organic phase increases, while it decreases as the pH-value of the aqueous phase is lowered. Since it is thus possible to adjust any desired distribution coefficient of the antibiotic in the aforementioned system, it is possible to remove a large proportion of inactive impurities by combining a few distribution operations.

(6) Another method suitable for enriching the antibiotic is chromatography, such as adsorption chromatography on a variety of materials, for example on Norit, alumina, magnesium silicates, silica gel, calcium sulfate, and partition chromatography on cellulose, starch, silica gel, Celite or the like as substrata, or chromatography on an ion exchanger resin, for example Dowex-50, polystyrene nuclear sulfonic acid cationic resin (U.S. Patent No. 2,366,007), Amberlite IRC–50 or the like.

(7) Another method of enriching the antibiotic is counter-current distribution according to Craig between two immiscible solvent phases.

In addition to other known iron-containing antibiotics such, for example as grisein, albomycin and the ferrimycins, the antibiotic A22765 belongs to the class of the sideramycins. As in the case of the other aforementioned representatives of this class its antibiotic action is antagonized by the growth-promoting substances ferrioxamine as described in U.S. patent application Ser. No. 57,834, filed September 22, 1960, by Ernst Gaeumann et al.

However, as will be seen from the table the antibiotic A22765 differs distinctly from the other sideromycins in its behaviour under paper-chromatographic examination:

TABLE

| Solvent system (volume ratio) (in two-phase systems the organic phase is used) | $R_f$-Values of the antibiotics | | |
|---|---|---|---|
| | A22765 | Ferrimycin A | Albomycin |
| n-Butanol+glacial acetic acid+water (4:1:5) | 0.25 | 0.48 | 0.13 |
| n-Butanol+glacial acetic acid+water (4:1:2) | 0.35 | 0.56 | 0.18 |
| n-Propanol+pyridine+water (60:4:40) | 0.50 | 0.52 | 0.31 |
| n-Propanol+glacial acetic acid+2.5% NaCl in water (10:1:8) | 0.65 | 0.76 | 0.50 |
| n-Propanol+glacial acetic acid+water (25:2:25) | 0.69 | 0.73 | 0.54 |
| n-Butanol + ethanol + glacial acetic acid+water (25:25:3:47) | 0.70 | 0.75 | 0.50 |
| Acetone+glacial acetic acid+water (60:3:37) | 0.72 | 0.75 | 0.59 |
| Methanol+0.1 N-HCl in water (3:1) | 0.75 | 0.62 | 0.52 |
| n-Butanol+glacial acetic acid+water (1:1:2) | 0.85 | 0.87 | 0.77 |

The antibiotic is identified on the paper bioautographically with *Staphylococcus aureus* or *Bacillus subtilis*.

Enriched antibiotic A22765 forms a pale brown powder which is readily soluble in water and other high-polar solvents such as methanol or dimethyl formamide. It is also soluble in phenol. It possesses basic properties so that it forms salts with acids.

In electrophoresis on Whatman paper No. 1 in ⅓ N-acetic acid the antibiotic migrates at 220 volts and 1.7 milliamperes within 3 hours a distance of 4.5 cm. (ferrimycin A 8.1 cm. and albomycin 4.5 cm.) towards the cathode in relation to a neutral comparative substance (fructose).

The infrared spectrum in Nujol is shown in FIG. 1. Significant bands in the IR spectrum are found at 3.00; 6.06; 6.45; 6.60; 7.46; 8.10; 8.63; 8.95; 9.62 and 10.28µ.

The salts of the antibiotic A22765 and of its components are derived from the known inorganic and organic acids, for example from hydrochloric, sulfuric, phosphoric, acetic, propionic, valeric, palmitic, oleic, succinic, citric, mandelic, glutamic or pantothenic acid. They constitute neutral or acid salts. They are prepared by the action of the acid concerned upon the free base or by double conversion of salts, for example of a A22765-sulfate with calcium pantothenate.

The free base of the antibiotic A227651 is readily accessible from its salts, for exampel from the sulfate by treatment in an aqueous medium with barium hydroxide, neutralizing the excess baryta with carbon dioxide, separating the precipitated barium carbonate and sulfate, and isolating the free base by freeze-drying. A simpler method of isolating the free base from the salts is the use of a strongly basic anion-exchanger, for example of the OH-form of the product marketed under the trademark Dowex-2 polystyrene dimethyl ethanol benzyl ammonium resin (U.S. Patent No. 2,614,099).

The antibiotic differs in a characteristic manner from the aforementioned known substances produced by strains of the species *Streptomyces aureofaciens*. In contradistinction to the new antibiotic the spiramycins and miamycin are very readily soluble in non-polar solvents, while the heptaenes are practically insoluble in water. The tetracyclins and congocidin act very strongly on Gram-negative bacteria but the antibiotic A22765 does not. Furthermore all these known antibiotics do not belong to the class of the sideramycins, that is to say their antibiotic function is not antagonized by the ferrioxamines.

The antibiotic A22765 displays a considerable antibiotic action towards a variety of test organisms. In the so-called agar transverse streak test it is active against the following test organisms: *Micrococcus pyogenes* var. *aureus*, *Streptococcus viridans*, *Streptococcus faecalis*, *Bacillus megaterium* and *Bacillus subtilis*.

The antibiotic A22765 acts also in vivo. After five subcutaneous administrations of 10 mg./kg. to mice infected with *Staphylococcus pyogenes* var. *aureus* or with *Streptococcus haemolyticus*, 87% and 50% respectively survived, while when 5 doses of 3.5 mg./kg. were given 50% survivals were registered in both cases. After mice infected with Pneumococcus Type III have been given five times 33 mg./kg. subcutaneously and perorally respectively, 100% and 25% respectively of survivals are registered.

The antibiotic is little toxic. Thus, for example mice will tolerate without injury a subcutaneous administration of 1000 mg. per kilogram body weight. Higher doses have not yet been tested.

The antibiotic A22765, its components, salts and derivatives can be used as medicaments, for example in the form of pharmaceutical preparations containing the aforementioned compounds in admixture with an organic or inorganic pharmaceutical excipient suitable for enteral, parenteral or local administration. Suitable excipients are substances that do not react with the new compounds such, for example, as gelatine, lactose, starches, magnesium stearate, talc, vegetable oils, benzyl alcohols, gums, polyalkylene glycols, white petroleum jelly, cholesterol or other known pharmaceutical excipients. The preparations may be, for example, tablets, dragées, powders, ointments, creams or suppositories, or in liquid form, solutions, suspensions or emulsions. They may be sterilized and/or may contain assistants such as preservatives, stabilizers, wetting agents or emulsifiers. They may also contain further therapeutically valuable substances.

The antibiotic A22765 can be used not only as a medicament against infections caused by the above mentioned microorganisms but also as a disinfectant and as preserving agent.

The following examples illustrate the invention without limiting its scope.

*Example 1*

Streptomyces NRRL 2858 is grown in a submerged culture. The nutrient solution used contains per liter of tap water, 20 grams of lactose, 20 grams of distillers' solubles, 1 gram of sodium nitrate and 5 grams of sodium chloride. The nutrient solution is sterilized in the inoculation flasks or in the fermenters for 20–30 minutes under 1 atmosphere gauge. The sterilized nutrient solution has a pH value of 7.5 to 8.0. For inoculating the nutrient solution up to 10% of a partially sporulating vegetative culture of the organism is used. Incubation is performed with vigorous shaking or stirring at 27° C., the cultures in fermenters being aerated with about 2 volumes of sterile air per volume of solution per minute. After having been incubated for 48–120 hours the culture solution displays its maximum inhibitive effect towards the test organisms (*B. subtilis, B. megatherium, Micrococcus pyogenes* var. *aureus*). The cultivation is discontinued and the mycelium as well as other solid constituents are separated from the solution containing the bulk of the antibiotic by filtration or centrifugation; if desired there may be added to the culture solution before it is filtered about 1% of a filter assistant, for example Hyflo Supercel (infusorial earth). The filter residues are washed with water and with aqueous methanol, and the washings are combined with the culture filtrate.

When the aforementioned nutrient solution is replaced by one that contains per liter of tap water the undermentioned nutrients, and cultivation and processing are performed in idential manner, culture filtrates having similarly high antibiotic activity are obtained:

(a)

| | G. |
|---|---|
| Rape groats | 20 |
| Glucose | 10 |
| $K_2HPO_4$ | 0.2 |
| Calcium carbonate | 1 |

(b)

| | |
|---|---|
| Glucose | 10 |
| Soybean flour | 10 |
| Corn steep liquor | 20 |
| Sodium chloride | 5 |
| Sodium nitrate | 1 |
| Calcium carbonate | 10 |

(c)

| | |
|---|---|
| Glycerol | 20 |
| Soybean flour | 10 |
| Sodium chloride | 5 |
| Sodium nitrate | 1 |
| Calcium carbonate | 10 |

(d)

| | |
|---|---|
| Glucose | 10 |
| Soybean flour | 10 |
| Sodium chloride | 5 |
| Sodium nitrate | 1 |

(e)

| | |
|---|---|
| Lactose | 20 |
| Distillers' solubles | 20 |
| Sodium chloride | 5 |
| Sodium nitrate | 1 |

When the strain Streptomycese aureofaciens A22083, A22141, A22652, A22931, A23269, A23344, A23978, A24034, A24066, A24292, A25536, A25699, A26043, A26354, A26392, A26467 or A26581 are cultivated under the conditions described above for Streptomyces NRRL 2858 for 48–120 hours, antibiotically active cultures are likewise obtained.

*Example 2*

3 liters of a culture filtrate obtained as described in Example 1 are stirred for 30 minutes at 20° C. with 60 grams of Norit. The mixture is then filtered and the antibiotically inactive filtrate is discarded. The Norit residue is washed twice with 1 liter of methanol of 50% strength and twice with 1 liter of acetone while being stirred. The washings contain no active material. The antibiotically active material is then eluted from the carbon by being stirred 3 times with 200 cc. of a mixture of n-butanol/glacial acetic acid/methanol/water in the ratio of 2:1:1:2 by volume. The combined eluates (600 cc.) are treated with 600 cc. of glacial acetic acid and agitated, whereupon the whole of the anti-biotic activity is found in the separated aqueous phase which is then concentrated to a small volume in vacuo at 30° C., and then lyophilized. Yield: 3.08 grams of a brown, water-soluble powder which contains the whole of the antibiotic activity that had been present in the culture filtrate. The lyophilized culture filtrate contains 40 times as much antibiotic as did the original culture filtrate.

*Example 3*

1 gram of an antibiotic preparation obtained as described in Example 2 is dissolved in 100 cc. of water, this solution is treated with 5 cc. of saturated aqueous sodium chloride solution and extracted three times with a mixture of phenol and chloroform (1 gram:1 cc.). The whole of the activity passes into the phenol+chloroform phase. The phenol extract is filtered through Celite (infusorial earth), treated with 10 cc. of water, 50 cc. of ether and 100 cc. of petroleum ether and then agitated. The organic phase is washed with a few cc. of water. The combined aqueous solutions, which now contain the antibiotic activity, are washed with benzene and lyophilized, to yield 171 mg. of enriched antibiotic A22765 in the form of a beige-colored, water-soluble powder which is about 4 times more antibiotically active than the starting material. The behavior of the antibiotic A22765 in paper-chromatography is shown in the table below. The control substances for comparing the Rf-values used were the antibiotics albomycin and ferrimycin A. The substances can be identified bioautographically with Straphylococcus aureus and Bacillus subtilis.

*Example 4*

20 grams of an antibiotic preparation obtained as described in Example 3 (phenol+chloroform extract from a culture filtrate) are dissolved in 400 ml. each of a lower and upper phase of a system consisting of 2 kg. of phenol, 10 liters of chloroform and 10 liters of a buffer pH 5.9 (1244 grams of $NaH_2PO_4.2H_2O$ and 348 grams of $K_2HPO_4$ made up to 10 liters with water) and distributed over 18 stages in a Craig apparatus. The contents of each unit are treated with 400 ml. of water, stirred with 8 liters of petroleum ether, and the aqueous phase washed free from phenol five times with 200 ml. of ether. The solutions are tested for Staphylococcus aureus in a plate test. The bulk of the antibiotic activity is in fractions 1 to 8. Sodium chloride is added to the combined solutions until they contain 10% thereof. 200 ml. of aqueous phase are extracted six times with 10 ml. of phenol+chloroform (1 gram+1 ml.) each time and washed four times with 50 ml. each time of an aqueous 0.01 N-hydrochloric acid solution containing 10% of sodium chloride. The extract is dried over Celite, Hyflo is added and the active substance precipitated on the Hyflo by adding 2 parts by volume of ether and 5 parts by volume of petroleum ether. The Hyflo is washed free from phenol with ether, the antibiotic is eluted with methanol and the solvent removed in vacuo. From elements 1–8 there are obtained 817 mg. of the enriched antibiotic A22765 in the form of a pale brown water-soluble powder which in relation to the starting material has an eight times greater activity. In the ultraviolet spectrum it shows end absorption at 220–230 m$\mu$ and a weak band at 330 m$\mu$. For the infrared spectrum see FIG. 1. The substances isolated from elements 9 to 18 show less activity than the starting material.

*Example 5*

The cation exchanger resin Dowex 50–WX2, polystyrene nuclear sulfonic acid resin (U.S. Patent No. 2,366,-007) (100/200 mesh), prepurified according to Hirs, Moore Stein, J. Biol. Chem. 219, 623 (1956), is applied by sedimentation in the ammonium form on to a column having a diameter of 1.5 cm. Thickness of layer: 45 cm. The resin is washed for 4 days with 0.1 molar ammonium acetate buffer pH 5.0 (37.0 ml. of glacial acetic acid, 37.5 ml. of ammonia of 25% strength with water to make up to 5 liters). 350 mg. of an antibiotic preparation obtained as described in Example 4 is poured on to the column in the form of a solution of 5% strength in 0.1 molar buffer, and the chromatogram is developed with the buffer, the latter having previously passed through a feed vessel of 1 liter capacity. Rate of flow: 18 ml. per hour. Volume of fraction: 9 ml. By running a buffer with a higher molecular concentration into the above mixing vessel a slow increase in the ion concentration is achieved. Thus, in the case of fraction 86 and fraction 134 respectively the concentration of the buffer running in is raised to 1-molar and 2-molar respectively. Evaluation is carried out by checking the activity in the plate test for Staphylococcus aureus. Extraction is carried out according to the same principle as in countercurrent distribution. From fractions 83 to 117 there are isolated 13 mg., from fraction 143 to 197 20 mg. of a pale brown powder. An approximately three-fold increase in activity is achieved in the case of both preparations. They show the absorption in the ultraviolet spectrum described in Example 4.

TABLE

| Solvent system (volume ratio) (in two-phase systems the organic phase is used) | Rf-Values of the antibiotics | | |
|---|---|---|---|
| | A22765 | Ferrimycin A | Albomycin |
| n-Butanol+glacial acetic acid+water (4:1:5) | 0.25 | 0.48 | 0.13 |
| n-Butanol+glacial acetic acid+water (4:1:2) | 0.35 | 0.56 | 0.18 |
| n-Propanol+pyridine+water (60:4:40) | 0.50 | 0.52 | 0.31 |
| n-Propanol+glacial acetic acid+2.5% NaCl in water (10:1:8) | 0.65 | 0.76 | 0.50 |
| n-Propanol+glacial acetic acid+water (25:2:25) | 0.69 | 0.73 | 0.54 |
| n-Butanol+ethanol+glacial acetic acid +water (25:25:3:47) | 0.70 | 0.75 | 0.50 |
| Acetone+glacial acetic acid+water (60:3:37) | 0.72 | 0.75 | 0.59 |
| Methanol+0.1 N-HCl in water (3:1) | 0.75 | 0.62 | 0.52 |
| n-Butanol+glacial acetic acid+water (1:1:2) | 0.85 | 0.87 | 0.77 |

What is claimed is:

1. Process for the manufacture of an antibiotic, which comprises cultivating a member selected from the group consisting of Streptomyces aureofaciens NRRL 2858, A22083, A22141, A22652, A22931, A23269, A23344, A23978, A24034, A24066, A24292, A25536, A25699, A26043, A26393, A25467 and A26581 in an aqueous medium under aerobic submerged conditions, in a nutrient solution containing an assimilable carbon source, nitrogenous compounds and inorganic salts until the culture displays a substantial antibiotic action and the antibiotic A22765 is then isolated from the nutrient solution.

2. Process as claimed in claim 1, wherein cultivation is carried out for 36 to 120 hours at a temperature between 18 and 40° C.

3. Process as claimed in claim 1, wherein the antibiotic is isolated from the nutrient solution by adsorption by means of a member of the group consisting of active carbon, diatomaceous earth and cation exchange and resin adsorbers.

4. Process as claimed in claim 3, wherein the adsorbed antibiotic is extracted with an acidic eluant.

5. Process as claimed in claim 4, wherein as eluant a member selected from the group consisting of an organic water-miscible solvent and a mixture thereof with water is used.

6. Process as claimed in claim 4, wherein as eluant a mixture of n-butanol, glacial acetic acid, methanol and water is used.

7. Process as claimed in claim 4, wherein the eluate is concentrated at a low temperature in vacuo and the antibiotic precipitated from the concentrate with acetone.

8. Process as claimed in claim 1, wherein the antibiotic is isolated from the culture solution by adsorption on an ion exchange resin.

9. Process as claimed in claim 8, wherein the antibiotic is adsorbed on a weakly acid ion exchange resin containing carboxyl groups and is eluted from the latter with an acidic eluant.

10. Process as claimed in claim 1, wherein the antibiotic is isolated by distribution between solutions of phenol in chloroform and aqueous solutions.

11. Process as claimed in claim 10, wherein the phenol content of the chloroform solution is varied.

12. Process as claimed in claim 10, wherein the pH-value of the aqueous solution is varied.

13. Process as claimed in claimed 1, wherein the antibiotic is enriched by chromatography on cellulose.

14. Process as claimed in claim 1, wherein the antibiotic is enriched by chromatography on ion exchange resins.

15. Process as claimed in claim 1, wherein the antibiotic is enriched by distribution between two immiscible solvent phases.

16. Process as claimed in claim 1, wherein the antibiotic is precipitated in an aqueous medium with picric acid and the precipitate is isolated.

17. Process as claimed in claim 16, wherein the sparingly soluble salt of the antibiotic with picric acid is reacted in a member selected from the group consisting of an aqueous medium methanol and acetone, with an inorganic acid, and the resulting inorganic salt of the antibiotic is isolated.

18. Process as claimed in claim 17, wherein the sulfate, is reacted with barium hydroxide, and the resulting free base of the antibiotic is isolated.

19. Process as claimed in claim 1, wherein the salts of the antibiotic are converted with an anion exchange resin into the free bases and the latter are isolated.

20. The antibiotic A22765 prepared by the process of claim 1, having the Rf values 0.25, 0.35, 0.50, 0.65, 0.69, 0.70, 0.72, 0.75 and 0.85 in the solvent systems (1) 4 n-butanol:1 glacial acetic acid:5 water, (2) 4 n-butanol:1 glacial acetic acid:2 water, (3) 60 n-propanol:4 pyridine:40 water, (4) 10 n-propanol:1 glacial acetic acid:25 water, (6) 25 n-butanol:25 ethanol:3 glacial acetic acid:47 water, (7) 60 acetone:3 glacial acetic acid:37 water, (8) 3 methanol:0.1 N-HCl in water and (9) 1 n-butanol:1 glacial acetic acid:2 water, respectively and its pharmaceutically useful acid-addition salts.

21. The hydrochloride of the antibiotic A22765 prepared by the process of claim 1, said antibiotic having the Rf values 0.25, 0.35, 0.50, 0.65, 0.69, 0.70, 0.72, 0.75 and 0.85 in the solvent systems (1) 4 n-butanol:1 glacial acetic acid:5 water, (2) 4 n-butanol:1 glacial acetic acid:2 water, (3) 60 n-propanol:4 pyridine:40 water, (4) 10 n-propanol:1 glacial acetic acid:8 2.5% NaCl in water, (5) 25 n-propanol:2 glacial acetic acid:25 water, (6) 25 n-butanol:25 ethanol:3 glacial acetic acid:47 water, (7) 60 acetone:3 glacial acetic acid:37 water, (8) 3 methanol:0.1 N-HCl in water and (9) 1 n-butanol:1 glacial acetic acid:2 water, respectively.

22. A sulfate of the antibiotic A22765 prepared by the process of claim 1, said antibiotic having the Rf values 0.25, 0.35, 0.50, 0.65, 0.69, 0.70, 0.72, 0.75 and 0.85 in the solvent systems (1) 4 n-butanol:1 glacial acetic acid:5 water, (2) 4 n-butanol:1 glacial acid:2 water, (3) 60 n-propanol:4 pyridine:40 water, (4) 10 n-propanol:1 glacial acetic acid:8 2.5% NaCl in water, (5) 25 n-propanol:2 glacial acetic acid:25 water, (6) 25 n-butanol:25 ethanol:3 glacial acetic acid:47 water, (7) 60 aceton:3 glacial acetic acid:37 water, (8) 3 methanol:0.1 N-NCl in water and (9) 1 n-butanol:1 glacial acetic acid:2 water, respectively.

23. A pharmaceutical preparation, consisting essentially of the antibiotic A22765 prepared by the process of claim 1, and a pharmaceutical carrier.

References Cited in the file of this patent

Saukugami: J. Antibiotics, January 1958 pages 6–13.